United States Patent [19]

Nair

[11] 4,426,356
[45] Jan. 17, 1984

[54] METHOD FOR MAKING CAPACITORS WITH NOBLE METAL ELECTRODES

[75] Inventor: Kumaran M. Nair, East Amherst, N.Y.

[73] Assignee: E. I. Du Pont de Nemours and Company, Wilmington, Del.

[21] Appl. No.: 430,872

[22] Filed: Sep. 30, 1982

[51] Int. Cl.³ .............................................. C22C 32/00
[52] U.S. Cl. ...................................... 419/21; 419/19; 419/40; 75/233; 75/234; 75/235; 75/247; 361/305
[58] Field of Search .................. 361/305; 75/233, 234, 75/235, 247; 419/19, 21, 40

[56] References Cited

U.S. PATENT DOCUMENTS

| 3,851,228 | 11/1974 | Sheard | 361/305 |
| 3,922,387 | 11/1975 | Larry | 361/305 |
| 4,294,616 | 10/1981 | Kim et al. | 75/234 |

Primary Examiner—Brooks H. Hunt
Assistant Examiner—Joel P. Okamoto

[57] ABSTRACT

A process for making capacitors using electrode compositions of finely divided particles of noble metals and certain inorganic metal oxides dispersed in an inert organic medium. Suitable inorganic metal oxides are $MoO_3$, $GeO_2$, $Pb_5Ge_3O_{11}$, $Nb_2O_5$, $NiO$, $ZnO$, $SnO_2$, $CdO$, metal phosphates, metal fluorides, phosphate glasses, germanate glasses, fluoride glasses and mixtures and precursors thereof.

7 Claims, 3 Drawing Figures

F I G. 1
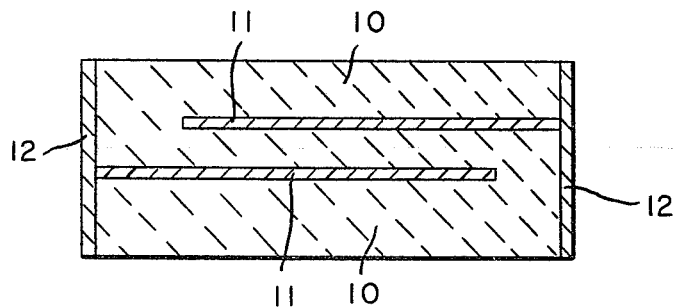
F I G. 2
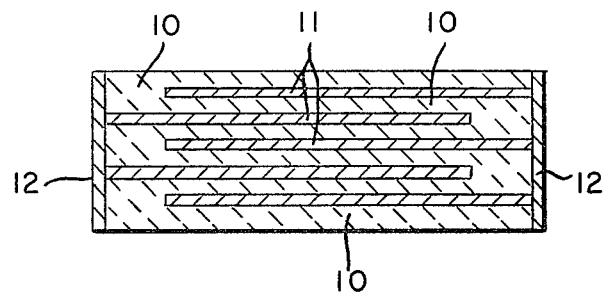

F I G. 3
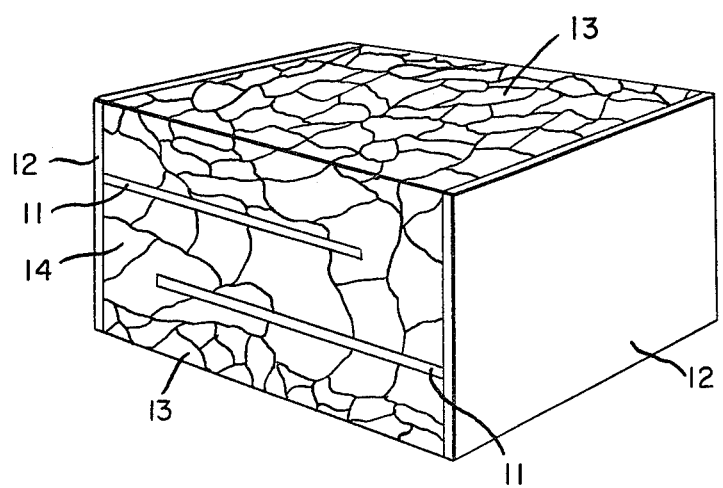

METHOD FOR MAKING CAPACITORS WITH NOBLE METAL ELECTRODES

FIELD OF THE INVENTION

The invention relates to the manufacture of capacitors and especially to the manufacture of capacitors with high yields in the manufacturing process.

BACKGROUND OF THE INVENTION

Monolithic capacitors comprise a plurality of dielectric layers, at least two of which bear metallizations (electrodes) in desired patterns. Such capacitors are made from a green (unfired) tape of particles of dielectric materials held together with an organic binder by cutting pieces of tape from a sheet of tape, metallizing some of the tape pieces, stacking and laminating the pieces of tape, cutting the laminate to form individual capacitors and firing the resultant individual capacitors to drive off the organic binder and vehicles and to form a sintered (coherent) body.

Rodriguez et al. in U.S. Pat. No. 3,456,313 disclose a process for making multilayer capacitors. FIG. 1 of U.S. Pat. No. 3,223,905 to Fabricius shows a multilayer capacitor which may be of alternating palladium and barium titanate layers.

Metallizations useful in producing electrodes for capacitors normally comprise finely divided metal particles applied to dielectric green tapes in the form of a dispersion of such particles in an inert liquid organic medium or vehicle. Selection of the composition of the metal particles is usually based on a compromise of cost and performance. Since base metals often are oxidized in air at elevated temperatures and/or in many cases react with the dielectric material during firing, noble metals are usually preferred because of their relative inertness during firing of the laminates to produce electrically continuous conductors.

Also often used as electrodes in capacitors are the coprecipitated noble metal alloys of Hoffman as disclosed in U.S. Pat. Nos. 3,385,799 and 3,390,981 and by Short in U.S. Pat No. 3,620,714.

In addition, in U.S. Pat. No. 4,075,681 Popowich discloses the use of several additive oxides such as $ThO_2$ and $Gd_2O_3$ in electrode metallizations for use in the manufacture of multilayer capacitors. In particular, those oxides are disclosed to improve the densification of the electrodes.

Despite the above-mentioned advances in the art of making capacitors, there exists a need to improve still further the integrity of the electrode thick film layers so they can be made thinner without incurring low yields in the manufacturing process. The term "yield" as used in this context refers to the percentage of capacitors which are within all of performance specifications, based upon the total number of capacitors which are fabricated.

SUMMARY OF THE INVENTION

The invention is therefore directed primarily to a metallization and to printable pastes thereof which are comprised of 70 to 99.5% by weight of a noble metal selected from the group consisting of silver, gold, palladium, platinum and mixtures and alloys thereof and 0.5 to 30% by weight, basis noble metal and metal oxide, of an inorganic metal oxide selected from the group consisting of $MoO_3$, $GeO_2$, $Pb_5Ge_3O_{11}$, $Nb_2O_5$, $NiO$, $ZnO$, $SnO_2$, $CdO$, metal phosphates, metal fluorides, phosphate glasses, germanate glasses, fluoride glasses and mixtures and precursors thereof.

In a second aspect, the invention is directed to the method of forming the above-described single plate and multilayer capacitors by (1) applying a layer of a mixture of finely divided particles of noble metal and the above-described inorganic metal oxide dispersed in organic medium to each of a plurality of layers of finely divided particles of dielectric material dispersed in organic binder;

(2) laminating a plurality of the electrode-printed dielectric layers to form an assemblage of alternating layers of dielectric material and electrode material; and (3) firing the assemblage of step (2) to remove the organic medium and organic binder therefrom and to sinter the noble metal and the dielectric material.

In a third aspect, the invention is directed to both single plate and multilayer capacitors comprised of fired alternating layers of dielectric material and the above-described metallization.

BRIEF DESCRIPTION OF THE DRAWING

The drawing consist of three figures.

FIG. 1 is a schematic representation of the cross section of a single-plate capacitor which comprises a pair of opposing electrode material layers 11 each having electrical communication with conductive terminations 12, the electrode layers 11 being separated by a layer of dielectric material 10.

FIG. 2 is a schematic representation of the cross section of a multilayer capacitor which comprises a plurality of opposing electrode layers 11 each having electrical communication with a conductive termination 12 which is common to every other electrode layer 11, the electrode layers 11 being separated by a layer of dielectric material 10.

FIG. 3 is a schematic representation of a multilayer capacitor made using the compositions of the invention which illustrates the changes in microstructure of the dielectric layers which are obtained by the compositions of the invention. As in FIG. 2 the multilayer capacitor comprises a plurality of opposing electrode layers 11 each having electrical communication with a conductive termination 12 which is common to all the other electrode layers 11 which are separated by a layer of dielectric material 10. The dielectric microstructure area not affected by the action of the metal oxide wetting agent of the invention is represented by areas 13 and the more dense dielectric microstructure area which results from the action of the metal oxide wetting agent is represented by area 14. Though in this figure the grains of the affected area are shown to be larger, they nevertheless can be either smaller or larger in size than the grains of the nonaffected area. The relative grain size is dependent upon the nature and concentration of the wetting agent when all other variables, such as heating rate, cooling rate, firing time, etc., are the same.

DETAILED DESCRIPTION OF THE INVENTION

A. Noble Metal

Suitable conductive materials for the electrode component of the invention are the noble metals silver, palladium, gold and platinum. Mixtures and alloys of these materials can be used as well. By far the most widely used electrode materials will be mixtures and alloys of palladium and silver, which are preferred because the palladium/silver alloy possesses an appropriate combination of technical properties and reasonable economy.

In the fabrication of multilayer capacitors, the required solidus temperature of the noble metal component of the invention will ordinarily be determined by the sintering temperature of the dielectric material on which it is applied. In turn, the sintering temperature is determined by the physical and chemical characteristics of the dielectric material, which is discussed below in the metal oxide section of the specification. Thus, to prevent excessive diffusion of the noble metal into the dielectric layer during sintering, it is preferred to employ a noble metal component (metal, alloy or mixture) having a solidus temperature higher than the firing temperature and preferably at least 50° C. higher.

Silver would most frequently be the noble metal electrode material of choice because it has both suitable conductive properties and the lowest cost of the noble metals. However, when used in capacitors, the electrode material is subjected to firing temperatures of 1100° C. or even higher. These temperatures are necessary for most dielectric materials to be sufficiently sintered to obtain suitable densification and dielectric properties. Because metallic silver melts at only about 961° C., silver metal alone would melt completely at 1100° C. or higher and be of such low viscosity that it would too readily diffuse into the dielectric material and thus substantially lower the dielectric properties of the sintered dielectric material. For this reason, it is preferred to employ an alloy of palladium and silver, usually about 30/70 by weight, which has a suitably high solidus temperature that it cannot migrate significantly into the dielectric material at normal firing temperatures. This alloy can be provided (1) in the form of already-formed Pd/Ag alloy, (2) by the use of homogeneous coprecipitated mixtures of Pd and Ag, or (3) by the use of mixtures of Pd and Ag powders which undergo alloying at the firing conditions. The latter two sources of alloy are not as effective as the first for the reason that any unalloyed silver will be available to migrate into the dielectric layer.

As a result of the above considerations, for those X7R and NPO class capacitors which are fired at 1100°, a 30/70 Pd/Ag mixture is used. On the other hand for a Z5U class capacitor which is fired at 1450° C., a 70/30 Pd/Ag or 100 Pd mixture is used as the noble metal component. In general, the ratio of palladium to silver is dependent upon the maximum curing temperature which is used to densify the dielectric material to a well-sintered body.

The particles of the noble metal component, as well as the inorganic metal oxide component(s) of the metallization which are used in the invention, should be sufficiently small that their pastes can be used even in conventional screen printing operations and that the particles can be readily sintered. Furthermore, in the production of capacitors from green dielectric sheets, the presence of coarse particles in the inner electrode prints must be avoided lest they cause puncturing of the green dielectric sheets. Generally, the metallizations are such that at least 90% of the noble metal and of the additive oxide particles are no greater than 5 microns in diameter. That is, in general their largest dimension should be no greater than 5 microns. However, when the thickness of the green dielectric layer is less than 1 mil, the particles must be correspondingly smaller.

It is further preferred that the noble metal particles be treated to remove any surface oxidation therefrom by which the surface of the particles become more efficient in their function as conductors. A preferred method of doing this is disclosed in copending U.S. patent application Ser. No. 430,871 filed 9/30/82 filed concurrently herewith and which is incorporated herein by reference as part of the best mode of practicing the invention. In the examples which are set out below, all of the noble metal powders used were treated identically with aqueous $H_3PO_2$ to remove surface oxides therefrom in the manner disclosed in applicant's copending U.S. patent application Ser. No. 430,871 filed 9/30/82.

B. Inorganic Metal Oxide

The inorganic metal oxides which are suitable for the method of the invention are those metal oxides on which both the electrode metal and the dielectric material when molten exhibit a small contact angle; that is, both the electrode metal and the dielectric material are wetted by the molten metal oxide. Suitable metallic oxide materials include $MoO_3$, $GeO_2$, $Pb_5Ge_3O_{11}$, $Nb_2O_5$, $NiO$, $ZnO$, $SnO_2$, $GdO$, metal phosphates, metal fluorides, phosphate glasses, germanate glasses, fluoride glasses and mixtures of any of these. Preferred metal oxides are $GeO_2$ and $Pb_5Ge_3O_{11}$. It will be recognized that precursors of these materials, that is, finely divided materials which form such metallic oxides under normal firing conditions, can be used as well.

As used herein the term "phosphate" "germanate" and "fluoride" glasses designate the nature of the basic network component of the glass, for example, phosphate glasses are glasses in which network consists of phosphate and/or phosphite anions. Germanate glasses are glasses which having a network of $GeO_3$ and $GeO_4$ anions and fluoride glasses have a network of metal fluoride.

The metallic oxides are subject to the same particle size limitations as the noble metal particles. However, in preferred metallizations, substantially all of the oxide particles are less than 1 micron in size, and in more preferred metallizations, substantially all of the oxide particles are less than 0.5 micron in size. Still further preferred oxide particles are those wherein their surface area is at least 5 $m^2/g$ or greater, and optimally particles having a surface area of at least 8 $m^2/g$ or greater.

The metallic oxides, which are an essential constituent of the metallizations used in the method of making capacitors in accordance with the invention, are used in an amount of at least 0.5% by weight (based on the total weight of noble metal and metal oxide) and preferably at least 1% by weight. While quite high amounts of such oxides can be used in the metallization, for example on the order of 30% by weight, any greater amounts serve no useful purpose. Moreover, under similar processing conditions, they may in fact reduce the integrity of the electrode layer and thus reduce capacitance of the device to below desirable levels. No more than 20% by weight metal oxide is preferred, and 1–10% by weight metal oxides is particularly preferred.

As is discussed hereinabove, a principal criterion for selecting the metal oxides which are useful in the process of the invention is their ability to wet the dielectric surface during the firing operation. Because of the severe conditions of the firing operation (temperatures of 1100° C. or higher), it is not ordinarily feasible to measure the actual contact angle between the sintered metal oxides and the sintered dielectric material. However, because a positive indicator of such wetting is the extent to which the metal oxides spread over the dielectric surface, a very effective but still very objective test for measuring wetting capability is to formulate the candidate metal oxide in a standardized manner with noble metal to form a thick film electrode paste, to apply the paste to a standardized dielectric tape, and to fire the resulting printed tape under standard conditions and then to observe the degree of coverage of the dielectric surface by the fired electrode materials. This measurement of dielectric surface coverage is quite readily carried out by visual estimation using SEM photographs of the metallized dielectric surface taken at 600X magnification or higher.

In the examples which follow, fifty parts by weight of 30/70 Pd/Ag powder mixture was dry blended with the indicated amount by weight of metal oxide and then dispersed in organic medium to 100 parts by weight total dispersion. Each of the thusly formulated electrode pastes was compared with a control paste consisting of 50 parts by weight of 30/70 Pd/Ag powder dispersed in 50 parts by weight organic medium, and the relative dielectric fired surface coverage of each was observed on generally commercially available NPO and X7R dielectric tapes and in some instances Z5U dielectric tapes as well. The NPO and X7R tapes were fired 1100° C., while the Z5U tape was fired at 1200° C.

C. Organic Medium

The third essential component of the compositions in accordance with the invention is the organic medium.

The main purpose of the organic medium is to serve as a vehicle for dispersion of the finely divided solids of the composition in such form that it can readily be applied to a ceramic or other substrates. Thus, the organic medium must first of all be one in which the solids are dispersible with an adequate degree of stability. Secondly, the rheological properties of the organic medium must be such that they lend good application properties to the dispersion. Thirdly, the solvent component of the medium must not significantly dissolve or otherwise attack the binder component of the dielectric tape.

Most thick film compositions are applied to a substrate by means of screen printing. Therefore, they must have appropriate viscosity so that they can be passed through the screen readily. In addition, they should be thixotropic in order that they set up rapidly after being screened, thereby giving good resolution. While the rheological properties are of primary importance, the organic medium is preferably formulated also to give appropriate wettability of the solids and the substrate, good drying rate, dried film strength sufficient to withstand rough handling, and good firing properties. Satisfactory appearance of the fired composition is also important.

In view of all these criteria, a wide variety of inert liquids can be used as organic medium. The organic medium for most thick film compositions is typically a solution of resin in a solvent and frequently a solvent solution containing both resin and thixotropic agent. The solvent usually boils within the range of 130°–350° C.

By far, the most frequently used resin for this purpose is ethyl cellulose. However, resins such as ethylhydroxyethyl cellulose, wood rosin, mixtures of ethyl cellulose and phenolic resins, polymethacrylates of lower alcohols, and monobutyl ether of ethylene glycol monoacetate can also be used.

Soluble solvents include kerosene, mineral spirits, dibutylphthalate, butyl carbitol, butyl carbitol acetate, hexylene glycol, and high-boiling alcohols and alcohol esters. Various combinations of these and other solvents are formulated to obtain the desired viscosity, volatility and compatibility with the dielectric tape.

Among the thixotropic agents which are commonly used are hydrogenated caster oil and derivatives thereof and ethyl cellulose. It is, of course, not always necessary to incorporate a thixotropic agent since the solvent/resin properties coupled with the shear thinning inherent in any suspension may alone be suitable in this regard.

The ratio of organic medium to solids in the paste dispersions can vary considerably and depends upon the manner in which the dispersion is to be applied and the kind of organic medium used. Normally, to achieve good coverage the dispersions will contain complementally by weight 40–90% solids and 60–10% organic medium.

The pastes are conveniently prepared on a three-roll mill. The viscosity of the pastes is typically 2–50 Pa.S when measured at room temperature on Brookfield viscometers at low, moderate and high shear rates. The amount and type of organic medium (vehicle) utilized is determined mainly by the final desired formulation viscosity and print thickness.

D. Dielectric Material

The dielectric material used in the present invention to make multilayer capacitors may be any dielectric material which is compatible with the electrode composition, according to principles well established in the art. Such dielectrics include barium titanate, titanium dioxide, alumina, zirconia, barium zirconate, lead zirconate, strontium titanate, calcium titanate, calcium zirconate, lead zirconate, lead zirconate titanate, neodymium titanate, etc.

Typical compositions for dielectric materials of the three most common types of dielectrics are given in Table 1 below:

TABLE 1

| Typical Dielectric Material Compositions | |
|---|---|
| Capacitor Class | Composition |
| NPO (Class I) | $BaTiO_3$, $Nd_2Ti_2O_7$, glass |
|  | $BaTiO_3$, $Mg\ TiO_3$, $\alpha\text{-}Zn_2TiO_4$ (minor) |
|  | $BaTiO_3$, $W_2Ti_2O_7$ (minor) |
| X7R (Class II-mid K) | $BaTiO_3$, $Pb_2Ti_2O_6$, $Bi_4Ti_3O_{12}$ |
| Z5U (Class II-high K) | $BaTiO_3$, $BaSnO_3$ |
|  | $BaTiO_3$, $CaSnO_3$, $SnO_2$ |

The above-referred dielectric classifications are those of the Electronic Institute of America (EIA).

E. Capacitor Processing

As described above, most multilayer capacitors are fabricated by printing the electrode metallization in the desired pattern upon a dielectric substrate which is a green (unfired) tape of dielectric material particles bound together by an organic binder. The printed dielectric substrates are stacked, laminated and cut to form the desired capacitor structures. The green dielectric material is then fired to effect removal of the organic medium from the electrode material and of the organic binder from the dielectric material. The removal of these materials is accomplished by a combination of evaporation and thermal decomposition during the firing operation. In some instances it may also be desirable to interpose a preliminary drying step prior to firing.

The organic binder component of the dielectric tapes is ordinarily a flexible polymer of a lower alkyl acrylate or lower alkyl methacrylate such as methyl acrylate, methyl methacrylate and ethyl acrylate or mixtures thereof. Such polymers can in some instances contain plasticizers and other additives to impart particular flexibility and/or other physical properties to the binder polymer. Water-based polymers such as latices and water-soluble polymers can also be used as the binder component of the dielectric tape.

When firing the above-described capacitor assemblages, it is preferred to employ a first firing step in which the assemblage is heated slowly to 100–550° C. which will be effective to remove all of the organic material without damage to the laminated assemblage. Typically the organic burnout period is 18–24 hours to assure complete removal of organics. When this has been completed, the assemblage is then heated more rapidly to the desired sintering temperature.

The desired sintering temperature is determined by the physical and chemical characteristics of the dielectric material. Ordinarily the sintering temperature will be chosen to obtain maximum densification of the dielectric material. For barium titanate based dielectric systems this temperature will range from 1100°–1450° C. However, it will be recognized by those skilled in the art of fabricating capacitors that maximum densification is not always needed. Therefore, the term "sintering temperature" refers to the temperature (and implicitly the amount of time as well) to obtain the desired degree of densification of the dielectric for the particular capacitor application. Sintering times also vary with the dielectric composition, but ordinarily on the order of two hours at the sintering temperature is preferred.

Upon completion of sintering, the rate of cooling to ambient temperature is carefully controlled in accordance with resistance of the components to thermal shock.

The following properties which are relevant to the ability of a given capacitor to function properly are referred to in the examples.

Capacitance

Capacitance is a measure of the capability of a material to store an electrical charge expressed mathematically, $C = KAN$ divided by $t$, where $A$ equals area overlap of electrodes, $t$ is thickness of dielectric layer. $K$ is dielectric constant and $N$ is number of dielectric layers.

The units of capacitance are farads or fractions thereof such as microfarads ($10^{-6}$ farad), nanofarads ($10^{-9}$ farad) or picofarads ($10^{-12}$ farad).

Dissipation Factor

Dissipation Factor (DF) is a measure of the phase difference between voltage and current. In a perfect capacitor the phase difference would be 90°. However, in practical dielectric systems, DF is less than 90° because of leakage and relaxation losses. In particular, DF is the tangent of the angle by which the current lags the 90° vector.

Insulation Resistance

Insulation resistance (IR) is a measure of the ability of a charged capacitor to withstand leakage in DC current. Insulation resistance is a constant for any given dielectric regardless of capacitance.

Dielectric Strength

This is defined as the voltage gradient which produces electrical breakdown or "flash" failure. It is a function of the material and thickness of the dielectric layer tested.

Electrode Array

This is qualitative visual evaluation of the integrity or uniformity of the electrode layers. Such factors as continuity, waviness, uniformity of thickness are considered qualitatively.

Ink Definition

This is a qualitative visual evaluation of the sharpness or resolution of the interface between the electrode and dielectric layers.

Electrode-Dielectric Delamination

This is a qualitative microscopic evaluation of the fired capacitor with respect to separations which may have taken place between the electrode and dielectric layers.

Electrode-termination Interface

This is a qualitative microscopic evaluation of the uniformity of the interface between the electrode layers and the termination.

The following examples and comparative showings are presented to illustrate the advantages of the present invention. In the examples and elsewhere in the specification and claims, all parts, percentages, proportions, etc., are by weight, unless otherwise stated.

Examples 1–12

A series of six electrode compositions was prepared in accordance with the invention in the manner described hereinabove in which the noble metal component was a mixture of 70% by weight in silver particles and 30% by weight palladium particles and the metal oxide was lead germanate ($Pb_5Ge_3O_{11}$) in powder form. The amount of metal oxide in the solids mixture was varied from about 2% (1/50) to about 30% (20/50). Each of the mixtures was dispersed in inorganic medium of the type described hereinabove to suitable printing viscosity. Each member of the series was then used to prepare a series of approximately 1,000 26-layer "1706" capacitors. The term "1706" refers here to capacitor dimensions which are 17 mm in length by 6 mm in width. Two series of capacitors were fabricated using commercially available NPO-type and X7R-type dielectric tapes. Between 200 and 300 of the capacitors produced in this manner were randomly chosen for evaluation of their electrical and related functional properties. The qualitative data below are average values derived from these tests. The quantitative values were uniformly obtained in all cases. This series of experiments, in which 1000 capacitors were made, was repeated two times without any apparent difference in results. The data for the NPO capacitors are given in Table 2 and the data for the X7R capacitors are given in Table 3 below. In the tables which follow G means good, N means not good and B means broken.

not contain metal oxides wetting agents, even when as much as 17% by weight of the metal oxides was used.

TABLE 2

Effect of Metal Oxide Concentration on NPO Capacitor Properties

| Ex. No. | Control | 1 | 2 | 3 | 4 | 5 | 6 |
|---|---|---|---|---|---|---|---|
| Composition |  |  |  |  |  |  |  |
| Pd/Ag Powder, % wt. | 100 | 98 | 96 | 94 | 91 | 83 | 71 |
| $Pb_5Ge_3O_{11}$, % wt. | — | 2 | 4 | 6 | 9 | 17 | 29 |
| Electrical Properties |  |  |  |  |  |  |  |
| Capacitance (NF) | 3.5 | 3.5 | 3.3 | 3.9 | 3.3 | 3.6 | 3.6 |
| DF (%) | $<1 \times 10^{-2}$ | $<1 \times 10^{-2}$ | $<1 \times 10^{-2}$ | $<1 \times 10^{-2}$ | $<1 \times 10^{-2}$ | $<1 \times 10^{-2}$ | $<1 \times 10^{-2}$ |
| IR (Ω) | $>1 \times 10^{11}$ | $>1 \times 10^{11}$ | $>1 \times 10^{11}$ | $>1 \times 10^{11}$ | $>1 \times 10^{11}$ | $>1 \times 10^{11}$ | $>1 \times 10^{11}$ |
| Dielectric Strength (V) | >250 | >250 | >250 | >250 | >250 | >250 | >250 |
| Electrode Array | G | G | G | G | G | B | B |
| Ink Definition | G | G | G | G | G | N | N |
| Electrode-dielectric delamination, % | >25 | None | None | None | None | 40 | 25 |
| Electrode-termination interface | G | G | G | G | G | G | B |
| Yield, % | <75 | 100 | 100 | 100 | 100 | 60 | 75 |

The foregoing data show that the metal oxides of the invention are quite effective to obtain good quantitative properties in all cases up to about 15% by weight, above which some degradation of these properties may be observed in the case of this particular dielectric material. Nevertheless, the yield and most of the qualitative properties were improved over those obtained from the control composition, which did not contain metal oxide wetting agents, even when as much as 29% by weight of the metal oxides was used.

Example 13

Using the dielectric surface wetting test procedures described above, a series of seven potential metal oxide wetting agents was tested as to the wetting characteristics of each and compared with a metal oxide-free control. The formulation variations and wettability results of this series on different dielectric materials are given in Table 4 below.

TABLE 3

Effect of Metal Oxide Concentration on X7R Capacitor Properties

| Ex. No. | Control | 7 | 8 | 9 | 10 | 11 | 12 |
|---|---|---|---|---|---|---|---|
| Composition |  |  |  |  |  |  |  |
| Pd/Ag Powder, % wt. | 100 | 98 | 96 | 94 | 91 | 83 | 71 |
| $Pb_5Ge_3O_{11}$, % wt. | — | 2 | 4 | 6 | 9 | 17 | 29 |
| Electrical Properties |  |  |  |  |  |  |  |
| Capacitance (NF) | 96.0 | 98.9 | 99.0 | 100.6 | 100.5 | 93.4 | 69.9 |
| DF (%) | 2.0 | 1.8 | 1.2 | 1.3 | 1.5 | 3.5 | 4.1 |
| IR (Ω) | $>1 \times 10^{11}$ | $>1 \times 10^{11}$ | $>1 \times 10^{11}$ | $>1 \times 10^{11}$ | $>1 \times 10^{11}$ | $>1 \times 10^{11}$ | $>1 \times 10^{11}$ |
| Dielectric Strength (V) | >125 | >125 | >125 | >125 | >125 | >125 | >125 |
| Electrode Array | G | G | G | G | G | G | G |
| Ink Definition | G | G | G | G | G | G | G |
| Electrode-dielectric delamination, % | 25 | None | None | None | None | 5 | 55 |
| Electrode-termination interface | G | G | G | G | G | G | G |
| Yield, % | 75 | 100 | 100 | 100 | 100 | 95 | 45 |

The data in Table 3 show much the same trends as are shown in Table 2 in that the metal oxides of the invention are quite effective to obtain good qualitative properties in all cases up to about 15% by weight, above which same degradation of these properties may be observed to a somewhat greater extent than for the NPO capacitors. Nevertheless, once again the yield and most of the qualitative properties were improved over those obtained from the control composition, which did

TABLE 4

Screening of Potential Metal Oxide Wetting Agents

| Candidate Composition | Parts by Weight | Dielectric Coverage (% total area) | | |
|---|---|---|---|---|
|  |  | NPO | X7R | Z5U |
| Control | — | 75 | 75 | 70 |
| CdO | 1 | 90 | 85 | — |
|  | 2 | 90 | 85 | — |
|  | 3 | 95 | 85 | — |
| $MoO_3$ | 1 | 90 | 95 | 80 |
|  | 2 | 90 | 95[1] |  |

TABLE 4-continued

Screening of Potential Metal Oxide Wetting Agents

| Candidate Composition | Parts by Weight | Dielectric Coverage (% total area) | | |
|---|---|---|---|---|
| | | NPO | X7R | Z5U |
| Nb$_2$O$_5$ | 1 | 85 | 90 | |
| | 2 | 85 | 90 | |
| | 3 | 90 | 90$^{(1)}$ | |
| ZnO | 2 | — | — | 90 |
| GeO$_2$ | 1 | 95 | 95 | 85 |
| | 2 | 95 | 95 | |
| | 3 | 90 | 95$^{(1)}$ | |
| Cd borosilicate glass | 1 | 95 | 90 | |
| | 2 | 95 | 90 | |
| | 3 | 95 | 90 | |
| Pb germanate glass | 1 | 90 | 90 | |
| | 5 | 95 | 95 | |
| | 10 | 95 | 95 | |

$^{(1)}$Some growth of second phase which can be eliminated by using lower concentration of metal oxide.

The above data show that each of the indicated materials was quite effective in improving the coverage of the dielectric surface to which they were applied. In general, the data also show that the wettability improved significantly as metal oxide concentration was raised. However, the data for MoO$_3$, Nb$_2$O$_5$ and GeO$_2$ also indicate that it can be desirable on some dielectric surfaces to use lower concentration to avoid the formation of a second phase in the dielectric. At least for the metal oxides examined here, they were somewhat less effective on the Z5U dielectric tape than on the NPO and X7R tapes. Nevertheless they still yielded a substantial 15–30% improvement over the control.

I claim:

1. A metallization for the preparation of electrodes for monolithic capacitors which is a mixture of finely divided particles of (a) 70–99.5% by weight noble metal selected from the group consisting of silver, gold, palladium, platinum, and mixtures and alloys thereof, and (b) 30–0.5% by weight of an inorganic metal oxide selected from the group consisting of MoO$_3$, GeO$_2$, Pb$_5$Ge$_3$O$_{11}$, Nb$_2$O$_5$, ZnO, SnO$_2$, CdO, metal phosphates, metal fluorides, phosphate glasses, germanate glasses, fluoride glasses, borosilicate glasses and mixtures and precursors thereof.

2. The metallization of claim 1 in which the noble metal is an alloy of palladium and silver having a solidus of at least 1000° C. or a mixture of palladium and silver which is in the proportion of an alloy having a solidus of at least 1000° C.

3. The metallization of claim 1 in which the metal oxide is Pb$_5$Ge$_3$O$_{11}$ or precursor thereof.

4. The metallization of claim 1 in which the metal oxide is GeO$_2$ or precursor thereof.

5. The metallization of claim 1 in which the metal oxide comprises 1–10% by weight of the metallization.

6. A thick film composition comprising the metallization of any of claims 1–5 dispersed in an organic medium.

7. A method for forming a monolithic capacitor comprising:
(1) applying a layer of the composition of claim 6 to each of a plurality of layers of finely divided particles of dielectric material dispersed in organic binder;
(2) laminating a plurality of the electrode-printed dielectric layers to form an assemblage of alternating layers of dielectric material and electrode material; and
(3) firing the assemblage of step (2) to remove the organic medium and organic binder therefrom and to sinter the noble metal and the dielectric material.

* * * * *

UNITED STATES PATENT OFFICE
CERTIFICATE OF CORRECTION

PATENT NO. : 4,426,356
DATED : January 17, 1984
INVENTOR(S) : Kumaran M. Nair

It is certified that error appears in the above—identified patent and that said Letters Patent are hereby corrected as shown below:

At the end of column 11, line 37, after the word "metal", insert -- having a solidus of at least 1000°C --.

Signed and Sealed this

Seventeenth Day of July 1984

[SEAL]

Attest:

GERALD J. MOSSINGHOFF

Attesting Officer    Commissioner of Patents and Trademarks